United States Patent
Roth et al.

(10) Patent No.: US 9,727,743 B1
(45) Date of Patent: Aug. 8, 2017

(54) SECURING A REMOTE DATABASE

(71) Applicant: Amazon Technologies, Inc., Seattle, WA (US)

(72) Inventors: Gregory B. Roth, Seattle, WA (US); Nathan R. Fitch, Seattle, WA (US); Bradley Jeffery Behm, Seattle, WA (US); Patrick J. Ward, Snoqualmie, WA (US); Graeme D. Baer, Seattle, WA (US); Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 15/012,639

(22) Filed: Feb. 1, 2016

Related U.S. Application Data (62) Division of application No. 13/332,182, filed on Dec. 20, 2011, now Pat. No. 9,256,762.

(51) Int. Cl.
  *G06F 21/62*  (2013.01)
  *G06F 21/60*  (2013.01)
  *G06F 17/30*  (2006.01)

(52) U.S. Cl.
  CPC ...... *G06F 21/602* (2013.01); *G06F 17/30477* (2013.01); *G06F 21/6218* (2013.01)

(58) Field of Classification Search
  CPC .......... G06F 21/00; G06F 21/60; G06F 21/62; G06F 21/6209; G06F 21/6218; G06F 21/6227; G06F 21/64; G06F 17/30; G06F 17/3002; G06F 17/30023; G06F 17/30286; G06F 17/30312; G06F 17/30315; G06F 17/30321–17/30336; G06F 17/30386;
  (Continued)

(56) References Cited

U.S. PATENT DOCUMENTS

| 5,727,197 A | 3/1998 | Burgess et al. |
| 7,685,437 B2 | 3/2010 | Hacigumus et al. |

(Continued)

OTHER PUBLICATIONS

Hore et al. "A Privacy-Preserving Index for Range Queries" [Online], 2004 [Retrieved on Jan. 9, 2017], Proceeding of the 30th VLDB Conference Toronto, Canada, Retrieved from: < http://www.isys.ucl.ac.be/vldb04/eProceedings/contents/pdf/RS19P2.PDF >.*

(Continued)

*Primary Examiner* — Eric W Shepperd
(74) *Attorney, Agent, or Firm* — Kilpatrick Townsend & Stockton LLP (57) ABSTRACT

A database access system may protect a field by storing the field as one or more underlying fields within a database. The database engine may not have access to keys used to protect the underlying fields within the database, such as by encryption, while the database access system may have access to the keys. Underlying fields may be used to store protected data and aid in the querying of protected data. The database access system may modify queries to use the underlying fields, which may include encrypting query terms and/or modifying query terms to fit the use of the underlying fields. The database access system may modify query results to match the format of the original query, which may include decrypting protected results and/or removing underlying fields.

18 Claims, 7 Drawing Sheets

(58) Field of Classification Search
CPC ......... G06F 17/30389; G06F 17/30424; G06F 17/30427; G06F 17/30442; G06F 17/30448; G06F 17/3061; G06F 17/30613–17/30631; G06F 17/30634; G06F 17/30657; G06F 17/30672; G06F 17/30699; G06F 17/30943–17/30952; G06F 17/30964; G06F 17/30979; H04L 9/32; H04L 9/3242; H04L 9/3247; H04L 2209/043; H04L 2209/76
See application file for complete search history.

(56) References Cited

U.S. PATENT DOCUMENTS

| | | | |
|---|---|---|---|
| 8,055,678 B2 | 11/2011 | Kim et al. | |
| 8,260,769 B1 | 9/2012 | Fuller et al. | |
| 8,812,867 B2 | 8/2014 | Jho et al. | |
| 8,819,451 B2 | 8/2014 | Lokam et al. | |
| 2004/0170277 A1* | 9/2004 | Iwamura | H04L 9/36 380/217 |
| 2005/0004898 A1 | 1/2005 | Bluhm et al. | |
| 2005/0147246 A1 | 7/2005 | Agrawal et al. | |
| 2005/0222965 A1 | 10/2005 | Chaudhuri et al. | |
| 2006/0041533 A1 | 2/2006 | Koyfman | |
| 2006/0107047 A1* | 5/2006 | Bar-El | G06F 21/79 713/168 |
| 2007/0113104 A1 | 5/2007 | Witt et al. | |
| 2008/0077806 A1* | 3/2008 | Cui | G06F 21/6227 713/193 |
| 2008/0133935 A1 | 6/2008 | Elovici et al. | |
| 2008/0319987 A1* | 12/2008 | Takuma | G06F 17/30616 |
| 2009/0083544 A1 | 3/2009 | Scholnick et al. | |
| 2009/0147960 A1 | 6/2009 | Maeda et al. | |
| 2009/0300013 A1* | 12/2009 | Kodavalla | G06F 17/30327 |
| 2010/0114843 A1* | 5/2010 | Farrar | G06F 17/30336 707/693 |
| 2011/0225164 A1* | 9/2011 | Narasayya | G06F 17/30336 707/741 |
| 2012/0068943 A1 | 3/2012 | Wang et al. | |
| 2013/0290249 A1 | 10/2013 | Merriman et al. | |

OTHER PUBLICATIONS

Ufford, Michelle "Index Defrag Script, v4.1" [Online], published Jun. 16, 2011 [Retrieved on Jan. 9, 2017], www.sqlfool.com, Retrieved from: < http://sqlfool.com/2011/06/index-defrag-script-v4-1/ >.*

U.S. Appl. No. 13/332,182 , "Non-Final Office Action", May 15, 2015, 24 pages.

U.S. Appl. No. 13/332,182 , "Notice of Allowance", Sep. 3, 2015, 14 pages.

Shmueli et al., "Designing Secure Indexes for Encrypted Databases", Springer-Verlag, DBSec'05, < http://www.ics.uci.edu/-ronen/Site/Research_files/Secure%20Indexes.pdf >, 2005, pp. 54-68.

Sproule , "Range Index", Wayback Machine snapshot https://web.archive.org/web/20030820115828/http://www.sliccware.com/WebHelp/Load_Definition/Indexes/Range_Index/RangeIndex.html, Aug. 20, 2003.

* cited by examiner

FIG. 1

Employee — 202

| ID | Name | Age | Salary-Enc | Salary-Signature | Salary-Range |
|---|---|---|---|---|---|
| 12 | Brad Beet | 30 | 456d8655bc2e56bb | 1017bfd4673955ffee4641ad3d481b1c | 789054fd3107c7b4cd5f22208ea3c701 |
| 13 | Jen Radish | 28 | bc7466555b1503f4 | 14ee22eaba297944c96afdbe5b16c65b | 454207fac54f9d28fa6aa122c62efb29 |
| 14 | Hooper Fruit | 45 | b71abc82d7453ac7 | 3078a255aee86ecc4ac1eb36b69af2f0 | 789054fd3107c7b4cd5f22208ea3c701 |
| 15 | Caddis Onion | 23 | 0177105e1dff2d64 | 7c77f048a2d02e784926184a82686fa0 | 7cd64b003a511f52938bf7faf41e0375 |

208   210   212   214   216   218

Salary Range Segments — 204

| Range-Signature | Range-Description-Enc |
|---|---|
| 454207fac54f9d28fa6aa122c62efb29 | b1756321dcbe8e4a69361e1571a46eff |
| 789054fd3107c7b4cd5f22208ea3c701 | ff54ddd35585d1c447f620ea281274b4 |
| 7cd64b003a511f52938bf7faf41e0375 | d9fd2af03938f98f47f620ea281274b4 |

222   220

Employee — 200

| ID | Name | Age | Salary |
|---|---|---|---|
| 123 | Brad Beet | 30 | $50,000 |
| 124 | Jen Radish | 28 | $100,000 |
| 125 | Hooper Fruit | 45 | $70,000 |
| 126 | Caddis Onion | 23 | $40,000 |

Signed Tables

| Table Name | Table-Signature |
|---|---|
| Employee | b1756321dcbe8e4a69361e1571a46eff |
| Vendor | ff54ddd35585d1c447f620ea281274b4 |
| Customer | d9fd2af03938f98f47f620ea281274b4 |

608  602  610 ⤶

Deleted Rows

| Table | ID | Signature |
|---|---|---|
| Employee | 12 | 454207fac54f9d28fa6aa122c62efb29 |
| Vendor | 403 | 789054fd3107c7b4cd5f22208ea3c701 |
| Customer | 334 | 7cd64b003a511f52938bf7faf41e0375 |

612  614  616  604 ⤶

Employee-Shadow

| Field Name | Supporting Field | Key Identifier | Signature |
|---|---|---|---|
| Salary | Salary-Enc | 37d1e3b3d71e1ae285185c015f266138 | ac1b9d4bf10c77ef7a49c56a8c99f939 |
| Salary | Salary-Signature | c898a6c03ce32dcff926189df1582482 | dd2d4015648dd921d9a9aca752371cc1 |
| Salary | Salary-Range | 20532874e6c801cd4eb413502bf134ed | 6a451cd74c2bf85997d3e10213f355b8 |

618  620  622  623  606 ⤶

Employee

| ID | Name | Age | Salary-Enc | Salary-Signature | Salary-Range |
|---|---|---|---|---|---|
| 12 | | | | | |
| 13 | Jen Radish | 28 | bc7466555b150 3f4 | 14ee22eaba297944c96afdbe5b16c65b | 454207fac54f9d28fa6aa122c62efb29 |
| 14 | Hooper Fruit | 45 | b71abc82d7453ac7 | 3078a255aee86ecc4ac1eb36b69af2f0 | 789054fd3107c7b4cd5f22208ea3c701 |
| 15 | Cad Onion | 23 | 0177105e1dff2d64 | 7c77f048a2d02e7849261 84a82686fa0 | 7cd64b003a511f52938bf7faf41e0375 |

SECURING A REMOTE DATABASE

CROSS-REFERENCE TO RELATED APPLICATIONS

This application is a Divisional of U.S. patent application Ser. No. 13/332,182, filed Dec. 20, 2011, issued to U.S. Pat. No. 9,256,762 on Feb. 9, 2016, and entitled "SECURING A REMOTE DATABASE," which is incorporated herein by reference in its entirety.

BACKGROUND

Databases may be used to store information with varied privacy needs. For example, these needs can be dictated by laws and agreements. Privacy needs can also be driven by customer relationships and trade secrets. Data requiring a high degree of privacy can be mixed with data requiring a lower degree of privacy because of the related nature of the data. For example, a person's name might be associated with a credit risk, where the name itself may not have a high privacy importance, but the credit risk information may require a high degree of privacy as it is stored with the person's name.

Some databases have been secured through database engine encryption and encryption during transit. Both of these methods assume trust of the administrator. For example, database engine encryption uses the database engine to encrypt and decrypt data. The encryption bolsters security by storing database contents in an encrypted form, but also gives access to all of the data to anyone who holds the root database password or has the ability to change the root database password. In another example, encryption during transit, such as encrypted database communications, protects data during transmission, but leaves the data within the database unprotected without more. In some installations, such as a shared database server, a database user may not have the ability to setup or secure a database. While various techniques have been employed to effectively secure databases, due to the complexity of the tasks, the employed techniques are of varied success.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include protecting data within a database from being accessed even with administrative database access, while remaining transparent to an application. A database access system may store protected fields as one or more underlying fields within a database. The database engine may not have access to keys used to protect the underlying fields within the database, such as by encryption, while the database access system may have access to the keys. When a query is received from a client, the database access system may convert query terms requesting protected fields into query terms for one or more underlying fields. The query results may be returned to the database access system, which may process the query results. The database access system may verify integrity of the query results, remove underlying field results, and compute information related to the underlying fields to form modified query results. The modified query results may then be returned to the client as an answer to the original query. By separating the keys from the database, access to the database may not provide access to the information in the protected fields.

By using a database access system, a database may exist in an untrusted environment. The environment may include an untrusted network, an untrusted server and/or untrusted database administration. The database access system may provide an assurance that protected data has not been compromised by unauthorized viewing of protected data (data privacy), deleting protected data (data tampering) or inserting foreign values into protected fields (data contamination). The data may be protected at rest (during storage) and during transit, as the data is only unprotected after receipt by the database access system.

Underlying fields may be used to aid in more complex queries that may be hindered when a field is protected, such as by encryption. Each query requesting a protected field may be altered by the database access system to use the underlying fields, including fields that support the query. In one embodiment, underlying fields may include an encrypted data storing the private data and a protected range field. The protected range field may use range segments having discrete values to represent a range of the values contained within the encrypted data field. The database access system may alter a query for an inequality of a protected field (or a range of the protected field) to instead use the protected range field to gather a set of query results including the desired range. The query results may then be further pared down by the database access system after the encrypted data fields returned within the query results have been decrypted. For example a range of salary may include $0 to $100,000. The salary range may then be divided into segments, such as $0 to $25,000, $25,001 to $50,000, $50,001 to $75,000 and $75,001 to $100,000. Each of these range segments may be given a protected identifier, such as an encrypted hash, so as to not disclose the ranges of the private information. An incoming client query may request salaries between $40,000 and $70,000. The database access system may alter the query to instead include the discrete ranges of $25,001 to $50,000 and $50,001 to $75,000. The query results may include encrypted data fields, which may then be decrypted to a numerical salary value. The decrypted query results may then be pared down from the range of $25,001 to $75,000 to the range of $40,000 to $70,000 by the database access system, discarding the extraneous results. By using a supporting field representing a range segment (sometimes referred to as a bucket), queries involving inequalities may be pared down.

As used herein, a field may represent a column within a table, while a value represents an entry or possible entry within the column as placed in a table row. For example, a salary field may include many salary values, each salary value having an entry or potential entry in a table row. Using FIG. 2 as an example, a salary field 206 is a column within the employee table 200. $50,000 is a salary value in the employee table 200.

Figure 1:
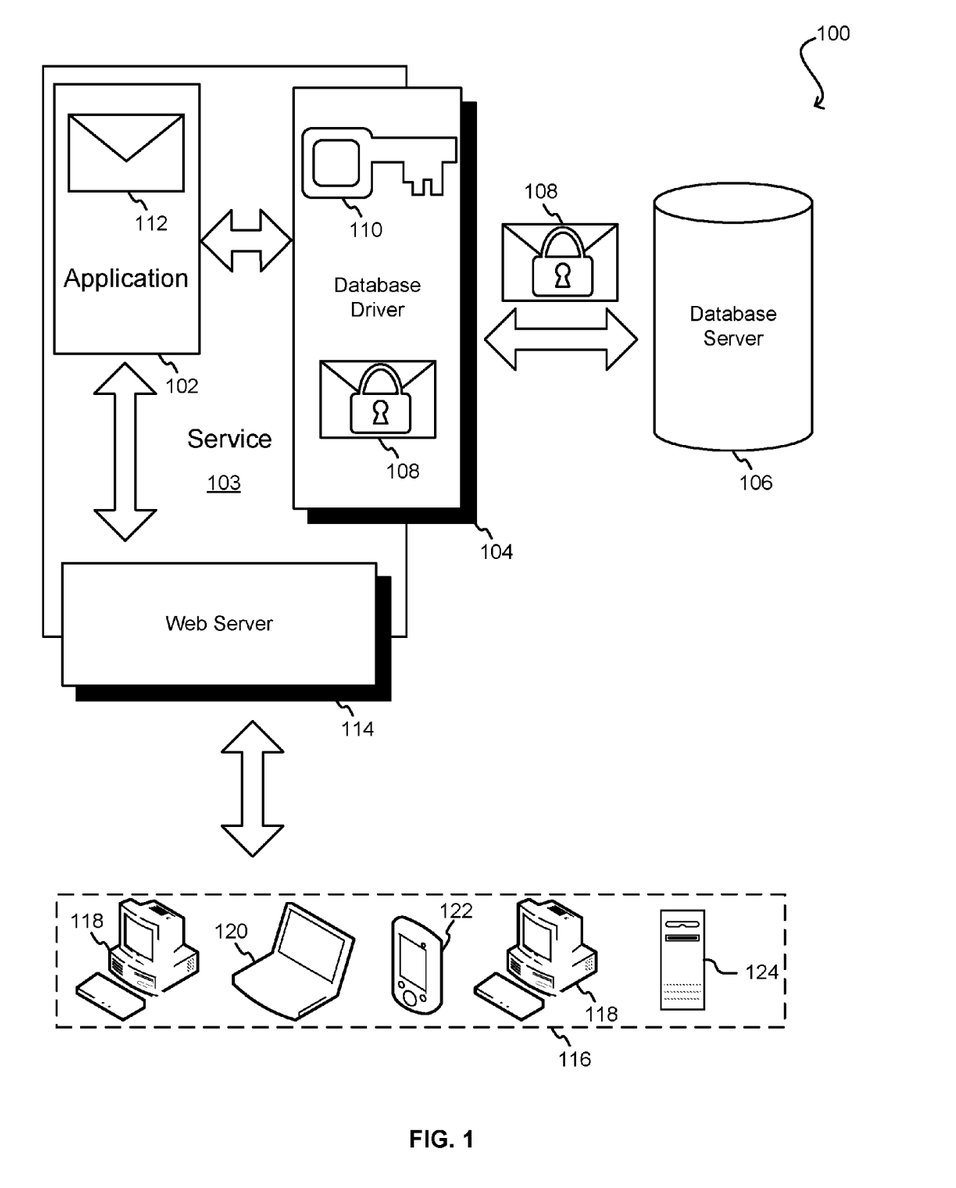
FIG. 1 shows an illustrative example of an environment in which a remote database may be secured in accordance with at least one embodiment.

In one environment 100 shown in FIG. 1, a client may be an application 102 on an application server within a service 103; the database access system may be a database driver 104 on its own server; and the database may be implemented on a database server 106 external to the control of the service. An application 102 may send a query to a database driver 104 requesting data that has been protected. The database driver 104 may convert the query terms from protected fields to underlying fields within the database server 106, such as converting a query term requesting the protected field to a query requesting an encrypted data field. The altered query may then be sent to the database server 106. The database server 106 may return query results having secured results 108 that include the underlying fields. Using a key 110 available to the database driver 104, but unavailable to the database server 106, the database driver 104 may use the underlying fields to prepare modified query results 112 that may include the protected data in an unencrypted form. The modified query results 112 may then be delivered to the application 102.

In some embodiments, the application 102 may make further use of the data. For example, the application 102 may present query results through a web server 114 to devices 116 that may include desktops 118, laptops 120, mobile devices 122 servers 124 and/or other computing resources. The application 102 may also receive information from devices 116 that cause the application to insert new information into the database, which may include protected data. The application may request an insertion of new protected data into the database. The database driver may use the new protected data to form underlying fields, which may include encrypting the protected data with the key 110. The underlying fields may then be sent to the database server 106 to be stored in the database. Database schema, may be used to identify which fields hold protected data and/or should use underlying fields when queried.

In many embodiments, the database access system may sit between a database and a client. In one embodiment, the database access system is a database driver, such as a Java Database Connectivity ("JDBC") driver. In another embodiment, the database access system is a proxy, the proxy capturing communication between a database server and the client. In another embodiment, the database access system is part of a hypervisor, the hypervisor capturing database communication between a guest operating system and a database server.

Figure 2:
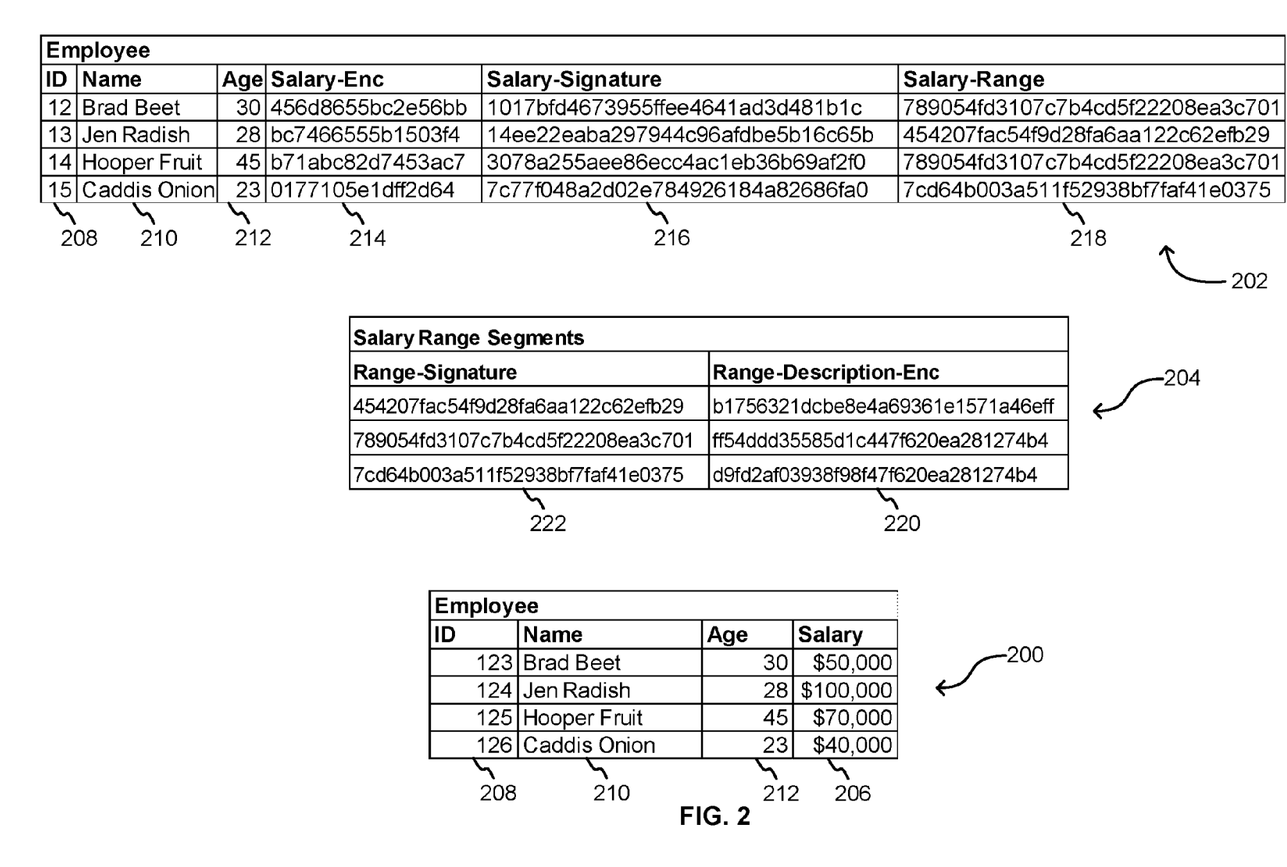
FIG. 2 shows an illustrative example of a set of database tables that include protected fields in accordance with at least one embodiment.

Turning now to FIG. 2, a representation of several database tables may be seen. Table 200 may represent a client view of database table, while tables 202 and 204 may actually be stored within a database. In one embodiment, client may be an application on an application server; the database access system may be a database driver running on its own server; and the database may be implemented on a database server (see, for example, FIG. 1). In the embodiment shown in FIG. 2, the salary field 206 of an employee table 200 may be considered protectable data, while the ID 208, name 210 and age 212 fields may be stored without protection. The salary 206 field may be stored in the database using three underlying fields, which include an encrypted data field 214, a field 216 and a range segment field 218. The encrypted data field 214 may be an encrypted representation of the salary field 206 encrypted with a key only available to the database access system. The signature field 216 may be used to verify the integrity of other fields in the table row using a key. In one embodiment, the signature verifies the integrity of the encrypted data field 214 only. In another embodiment, the signature verifies the integrity of all of the underlying fields. In another embodiment, the signature is used to verify the integrity of the entire row. The range segment field 218 may reference a range in which the encrypted data field may be found. The range segment field may thus be queried in place of an inequality. The range segment field 218 may be supported by a range segments table 204. The range segments table 204 may list range references, such as a signature with corresponding encrypted descriptions. By using a signature, ranges of the protected field may remain unknown.

Different technologies may be used in a signature field to represent the integrity of a signed field, signed row, signed value or other signed data. Some embodiments may use message authentication codes in the signature field, including those using symmetric encryption. In one embodiment, a hash based message authentication code ("HMAC") may be used. Other embodiments may use digital signatures, including those using asymmetric encryption. For example, RSA-Probabilistic Signature Scheme ("PSS") may be used.

The operation of the database may remain transparent to the client. The client may see the database as table 200 because of the database access system hiding the implementation details that may include tables 202 and 204. For example, if the client were to present a query requesting the salary of "Brad Beet," the database access system may alter the query request the salary encrypted data field 214 and the salary signature field 216 corresponding to "Brad Beet." The database would return a salary encrypted data value of "456d8655bc2e56bb" and a salary signature value of "1017bfd4673955ffee4641ad3d481b1c." The database access system may decrypt the salary encrypted data value to be "$50,000" (as seen in 200) using a private key and verify the integrity of the data value using the signature which also may use a private key. Once the underlying fields have been modified or removed to match the original query, the modified query results may be returned to the client, such as the "$50,000" result for "Brad Beet." An example of this query process may be seen in FIG. 3.

A signature may be used to verify the integrity of fields, tables, values and other database information. In one embodiment, the signature is based on the salary encrypted data field. The signature may provide a method of verifying the integrity of the salary encrypted data field and also an ability to determine equivalence between encrypted values. For example, if a new person had a signature of "1017bfd4673955ffee4641ad3d481b1c" in the Salary signature field 215, a user would be able to determine that the new person has the same salary as "Brad Beet." In another embodiment, the database schema may be verified for integrity. The schema may contain mappings between key identifiers and fields. For example, upon startup, a database access system may read encryption schema within the database, cache the encryption schema and verify the one or more signatures of the encryption schema.

The queries may also use a support field to aid in the processing of protected fields. For example, a client may request the names of all employees who make less than $60,000 a year. The database access system may note that the salary field 206 is a protected field with a salary range 218 underlying field. The database access system may then retrieve the salary range segments 204 table information and decrypt the range description field 220 from the salary range segments table 204. The range descriptions may include a "0-49999" segment as "7cd64b003a511f52938bf7faf41e0375," a "50000-74999" segment as "789054fd3107c7b4cd5f22208ea3c701," and a "75000+" segment as "454207fac54f9d28fa6aa122c62efb29." As the segments containing less than $60,000 are "0-49999" and "50000-74999," salary range fields 218 matching the discrete values of "7cd64b003a511f52938bf7faf41e0375" and "789054fd3107c7b4cd5f22208ea3c701" may be queried from the database. After decrypting the salary encrypted data values associated with "Brad Beet," "Hooper Fruit," and "Caddis Onion," it will be discovered that the salary belonging to "Hooper Fruit" is outside the requested range. Therefore, "Hooper Fruit" will be filtered out of the modified query results and "Brad Beet" and "Caddis Onion" returned. An example of this query may be seen in FIG. 4.

In some embodiments, the range table is created upon demand and/or revisited upon substantial changes. For example, upon a first inequality query, the database access system may request all rows from the appropriate tables and compute the inequality locally. While computing the inequality or afterward, the database access system may compute range segments and store them in the database in a range segment table and with the corresponding encrypted data field. Upon subsequent inequality queries, the query may be performed as previously described in a prior example. As part of the process of the query, the database access system may decide whether the underlying field, such as the range description, is in need of an update. This update may be performed before, during or after sending the altered query to the database.

In some embodiments, some queries without support fields may cause more local processing. For example, if a maximum salary were requested by a client, the database access system may alter the request to return all rows from the employee table. All of the salary encrypted data values within the salary encrypted data field may be decrypted. The unencrypted salary values may then be processed for a maximum. After obtaining the maximum, the modified query result of the maximum may be returned to the client system. An example of this query may be seen in FIG. 5. However, some embodiments may contain underlying fields and/or tables that track field statistics. For example, the employee table 202 may have an associated support table with underlying fields that track statistics upon insert or modifications to the employee table, including average, total and count statistics.

In some embodiments, not all users have all the keys. In some embodiments, different keys may be used to grant differing access to the underlying data. For example, different keys may be used for a range segment field 218 and an encrypted data field 214. A salary encrypted data field 214 may be encrypted with a first key. A salary range field 218 and range description field 220 may be protected with a second key. A user with only the second key may be able to perform discrete range queries and compile results without having access to the underlying specific salary values. Having different keys for differing underlying fields may allow granular access to the database without providing full access to the data. In some embodiments, the granularity may be predetermined by choosing the supporting field information, such as the pre-determined range segments.

Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Figure 3:
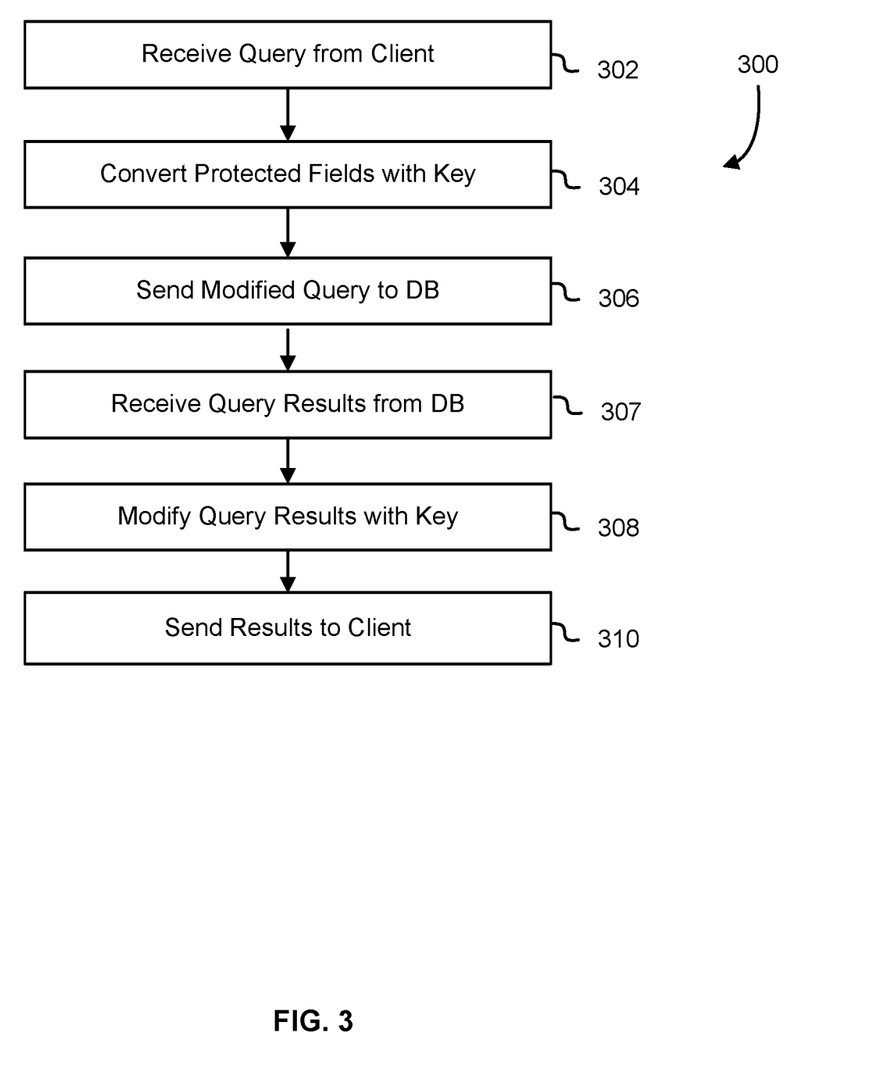
FIG. 3 shows an illustrative example of a process that may be used to secure a remote database in accordance with at least one embodiment.

A process 300 may be used to query a protected database. In one embodiment, an application server may query a remote database server through a hypervisor monitoring database communications. A database access system may receive 302 a query from a client, the query operating on a protected field. The protected field query terms may be converted 304 to use underlying fields, such as an encrypted data field. The query may then be sent to be performed 306 on the database. The database access system may receive 307 the query results and modify the query results 308 to satisfy the original query, such as by decrypting encrypted data fields. The modified query results may be sent 310 to the client. Specific examples of this process were described in conjunction with FIG. 2.

It should be recognized that an incoming query from a client, when modified, may result in one or more queries being performed on the database as a modified query. For example, FIG. 4 and its associated text discuss an inequality client query broken into two queries. A first query retrieves range segments. A second modified query retrieves rows matching selected range segments.

Figure 4:
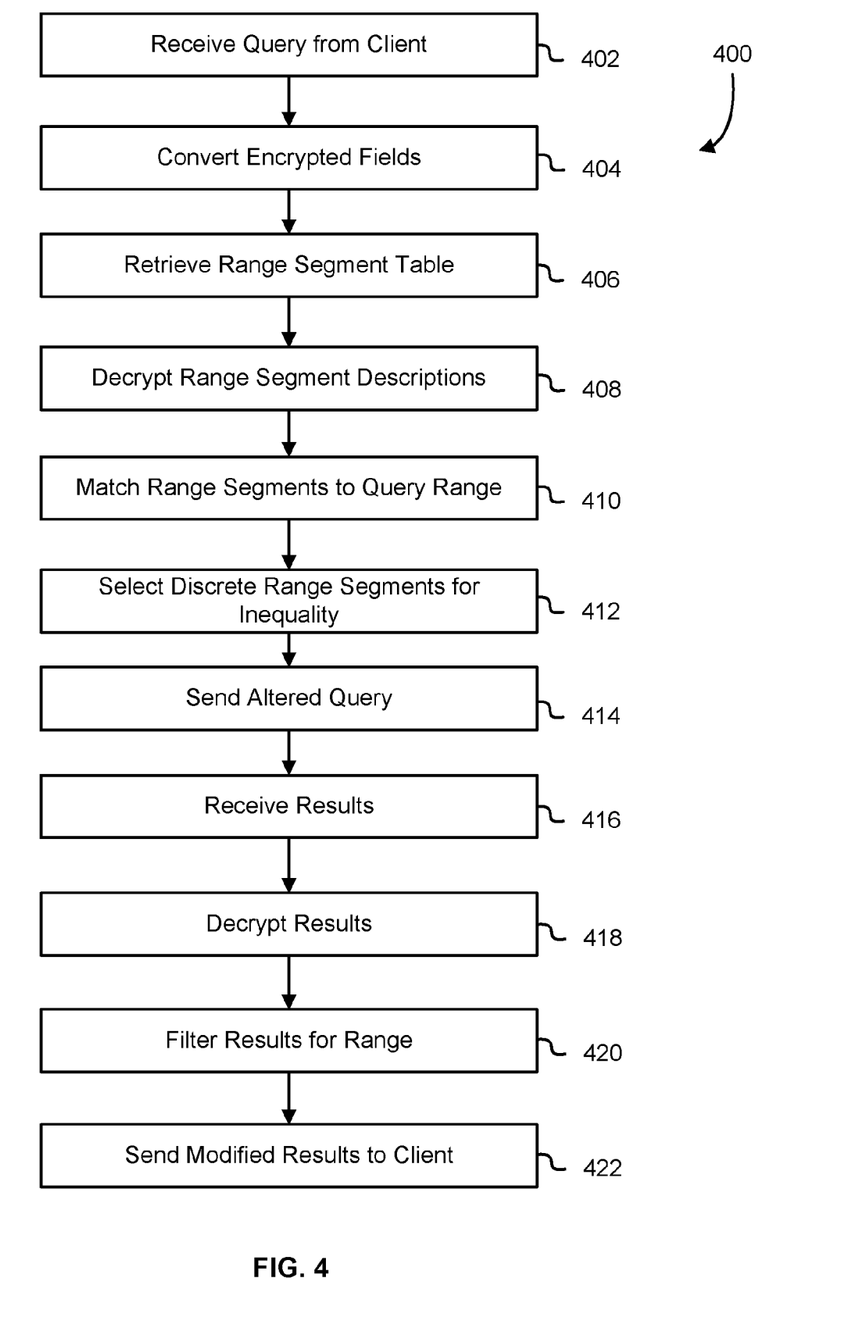
FIG. 4 shows an illustrative example of a process that may be used to process an inequality using a secured remote database in accordance with at least one embodiment.

A process 400 may be used to query with an inequality a database having a protected field. In one embodiment, a web server may query a remote database server through a database driver. The database access system may receive 402 a query having an inequality from a client. The database access system may convert 404 any data needing encryption to match encrypted field data. The range segment table may be retrieved 406 and descriptions of the range segments decrypted 408. Using the range segment descriptions 408, discrete range segment values may be matched 410 to include the query range. The discrete range segments may be selected 412 to use in place of the inequality in the altered query. The altered query may be sent 414 to the database. Results from the altered query may be received 416. Underlying fields may be decrypted 418, including the encrypted data field. The encrypted data field may be examined for the original inequality and extraneous results may be filtered 420 out. The modified results may be sent to the client 422. Specific examples of this process were described in conjunction with FIG. 2.

Figure 5:
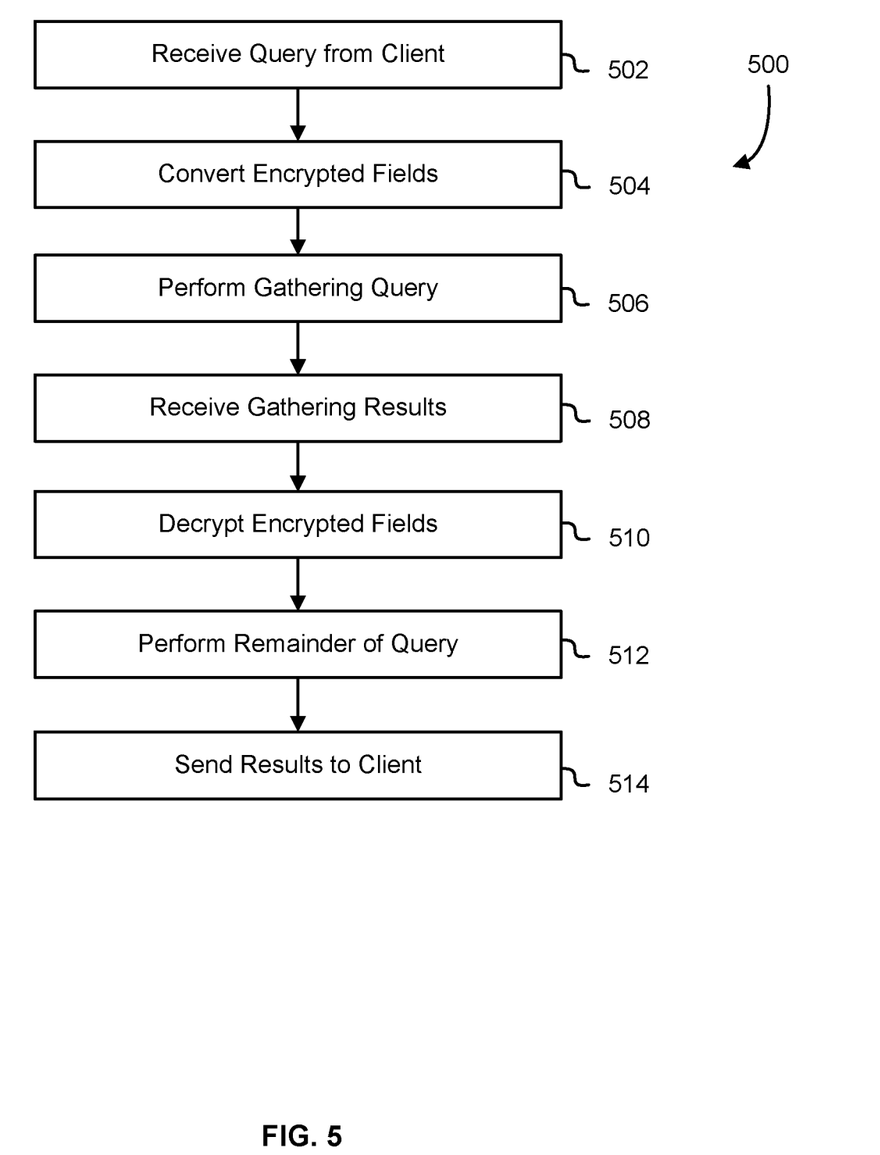
FIG. 5 shows an illustrative example of a process that may be used to process a query having secondary processing in accordance with at least one embodiment.

A process 500 may be used to query a database having a protected field without an underlying field supporting the query. In one embodiment, an application server may query a remote database server through a database proxy. The database access system may receive 502 a query from a client. The database may convert 504, if needed, query terms to match underlying fields, such as encrypting query terms to match encrypted data fields. Having no underlying field matching the query, such as a minimum, maximum or average value of a protected field, the database access system may perform 506 a gathering query requesting all potential candidates for inclusion in the query results. The query results may be received 508. Underlying fields may be unprotected, such as by decrypting 510, and/or verified. The remainder of the query may be performed 512 on the unprotected values. The modified query results may be compiled and sent 514 to the client. Specific examples of this process were described in conjunction with FIG. 2.

The database access system may also be used to detect unauthorized changes to the database, such as in an employee table 600. In the embodiment shown in FIG. 6, the database may include a signed tables table 602, employee shadow table 606 and deleted rows table 604 to aid in database security. The signed tables table 602 may be used as a signature to verify that no changes have been made to a table. The signed tables table 602 may include a table name field 608 and a table signature field 610. The table name field may be used to search for a signature value corresponding to a table name. In one embodiment, a query may verify the integrity of a table by computing a signature based at least in part on the table values and a key held by the database access system. If the signature matches the corresponding signature value in the signature field 610, the table is verified as unchanged. If a table is altered by an insertion or deletion of data, the signature value may be recalculated and updated in the Signed Tables Table 602.

Figure 6:
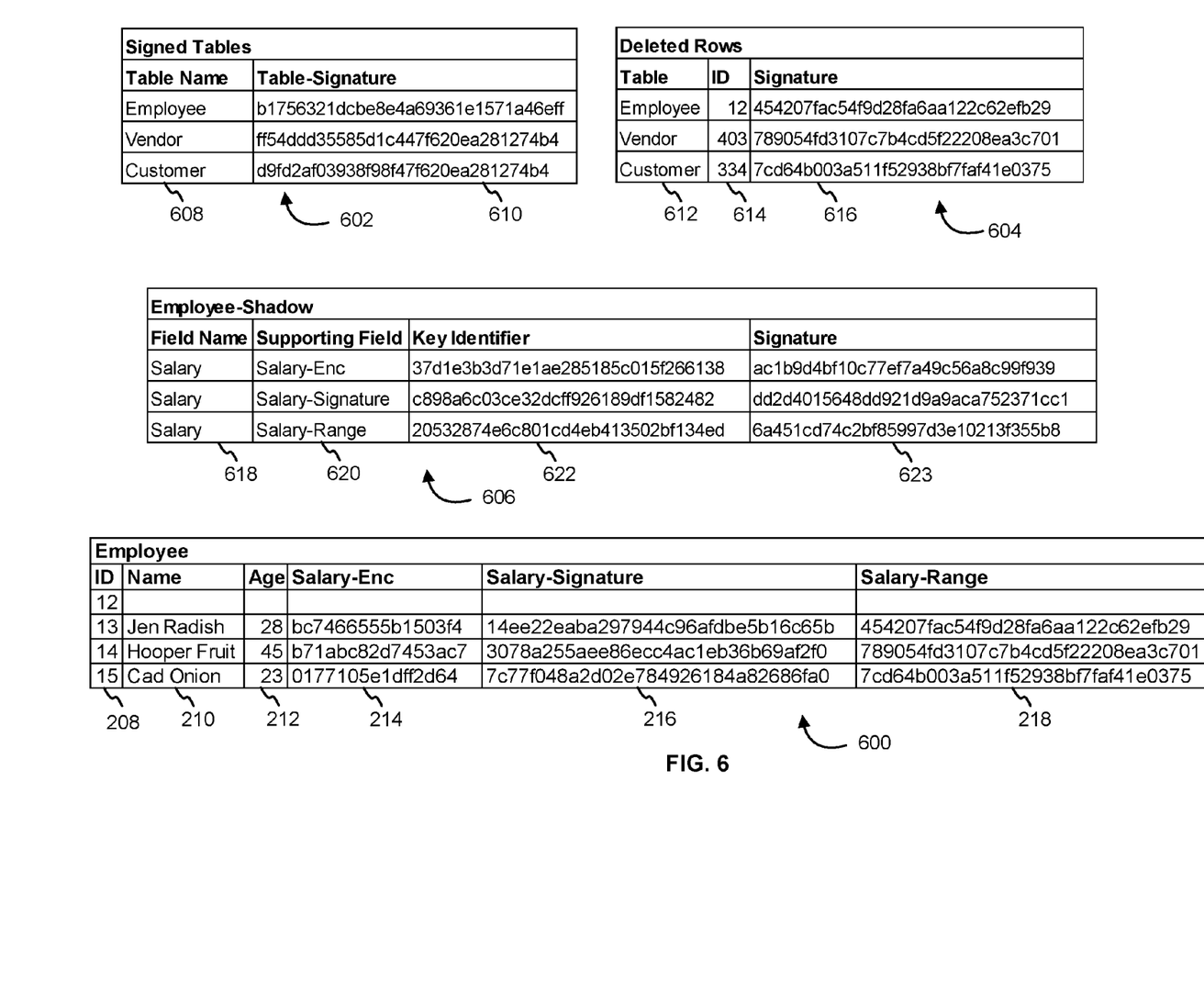
FIG. 6 shows an illustrative example of a set of database tables that include support tables in accordance with at least one embodiment.

A deleted rows table 604 may be used to prevent data contamination. The deleted rows table 604 may contain a table identifier field 612, a deleted row id field 614 and a signature field 616. The table identifier field 612 may identify the table in which a row has been deleted. The row id field 614 may identify the row that has been deleted. The signature field 616 may contain a signature that may be used to verify that the deletion was authorized. For example, a request to delete row 12 from employee table 600 may be received from a client. The database access system may construct a modified query to delete the information stored in row 12 of the employee table 600 and insert a new row in the deleted rows table 604 identifying the employee table 600 and the row id of 12. The database access system may then create a signature to verify the deletion. In one embodiment, the signature may be based on the table name and row deleted such that a signature of "Employee 12" may create the signature of "454207fac54f9d28fa6aa122c62efb29."

An employee shadow table 606 may be used to identify logical fields mappings to underlying fields and which key may be used for each underlying field. A database access system may also use this table to identify any keys that may be out of date. The employee shadow table 606 may include a logical field name field 618, a supporting field name field 620, a key identifier field 622 and a signature field 623. The logical field name field 618 may identify a logical field to which an underlying field and a key are applicable. The supporting field name field 620 may identify a supporting field to which a key and logical field is applicable. The key identifier field may include an identifier of the key used to protect and/or access the data identified in the supporting field. In some embodiments, the key identifier is a hash, such as a signature, that may be used to identify the key. For example, a user having access to the key with a hash of "c898a6c03ce32dcff926189df1582482" may be able to access the "Salary-Range" underlying field information. However, without the key with the hash of "37d1e3b3d71e1ae285185c015f266138," the user would not be able to access the encrypted salary information. The signature field 623 may be used to verify the integrity of the associated row in the employee shadow table 606.

In some embodiments, more information may be included in supporting tables. For example a timestamp, an identification number of the requesting client, and other information may be included in the signature or other fields in the supporting tables. In one embodiment, the last four digits of the signature may identify the requesting client.

It should be recognized that while support tables and fields have been discussed as if they were stored in the database, support tables and fields may also be stored in the database access system, external to the database and/or internal to the database. For example, the Salary Range Segments Table 204 discussed in FIG. 2 may be stored locally by the database access system to reduce the number of queries, while only requiring a small amount of space as a tradeoff.

Figure 7:
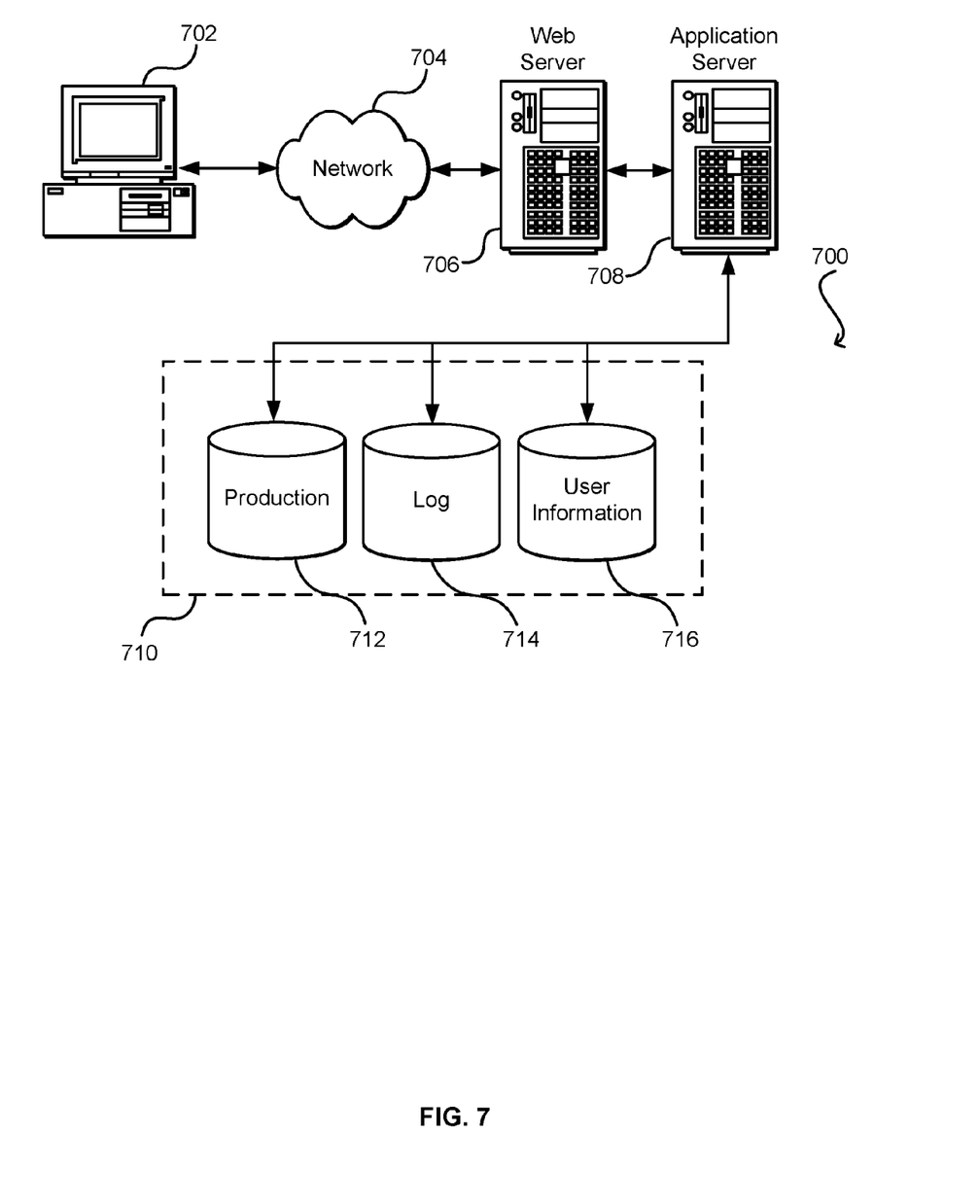
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases, or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system for securing a remote database, comprising:
   one or more processors; and
   memory, comprising instructions executable by the one or more processors to cause the computer system to at least:
   receive, by a database access system, a request to generate a field in a database;
   select a key to associate with the field, the key inaccessible to a database engine responsible for the database, and the key accessible to the database access system;
   prepare underlying fields in the database in place of the field, the underlying fields comprising an encrypted data field and a protected range field, the encrypted data field encrypted based at least in part on the key, and the protected range field comprising a range segment that represents a range of encrypted data values within the encrypted data field; and
   maintain a list to respond to a query for the range of the encrypted data values, the list associating a range of values within the field with the range segment representing the range of encrypted data values within the encrypted data field, the list generated based at least in part on a request for the range of values within the field.

2. The computer system of claim 1, wherein the list comprises a protected range list, and wherein the instructions further cause the computer system to at least:
   populate the protected range list with one or more encrypted range descriptions, the encrypted range descriptions identifying the range segment of the encrypted data values.

3. The computer system of claim 1, wherein the underlying fields comprise a signature field, a value of the signature field computed based at least in part on the key and on an encrypted data value from a row containing the signature field.

4. The computer system of claim 1, wherein the instructions further cause the computer system to at least:
   generate a table signature based at least in part on the encrypted data values within the encrypted data field; and
   store the table signature associated with the table.

5. The computer system of claim 1, wherein the instructions further cause the computer system to at least:
   store a protected range value with an encrypted data value upon insert or modification of the encrypted data value, the protected range value selected from the list.

6. The computer system of claim 1, wherein the instructions further cause the computer system to at least:
store a signature with an encrypted data value upon insert or modification of the encrypted data value, the signature generated based at least in part on the encrypted data value.

7. The computer system of claim 1, wherein the instructions further cause the computer system to at least:
obtain the list based at least in part on the query, the query comprising a requested range of field values within the protected range field; and
modify the query to request a set of range segments from the protected range field, the set of the range segments comprising at least the requested range of the query.

8. The computer system of claim 7, wherein the instructions further cause the computer system to at least:
send the modified query to the database engine;
receive a query result from the database engine, the query result comprising an underlying field result associated with the protected range field; and
modify the underlying field result based at least in part on the key.

9. A computer-implemented method comprising:
selecting a key to associate with a field of a database based at least in part on a request to generate the field of the database, the key inaccessible to a database engine responsible for the database;
preparing an encrypted data field and a protected range field in place of the field, the encrypted data field encrypted based on the key, and the protected range field comprising a range segment that represents a range of encrypted data values within the encrypted data field; and
maintaining a list to respond to a query for the range of the encrypted data values, the list associating a range of values within the field with the range segment representing the range of encrypted data values within the encrypted data field, the list generated based at least in part on a request for the range of values within the field.

10. The computer-implemented method of claim 9, further comprising:
obtaining the list based at least in part on the query; and
modifying the query to request a set of range segments from the protected range field, the set of the range segments comprising at least a requested range of the query.

11. The computer-implemented method of claim 9, further comprising:
maintaining a deleted rows table that comprises a deleted row and a corresponding authentication code, the corresponding authentication code based at least in part on the deleted row and the key.

12. The computer-implemented method of claim 11, further comprising:
obtaining a query result from the database based at least in part on the query; and
verifying the query result against the deleted rows table.

13. The computer-implemented method of claim 9, further comprising:
deleting a row of the database based at least in part on a deletion request;
generating an authentication row associated with the code based at least in part on the row being deleted, the authentication code encrypted with the key; and
verifying an integrity of a query result by comparing the authentication code with a computed authentication code, the query result comprising a protected field value, the computed authentication code based at least in part on the protected field value.

14. The computer-implemented method of claim 9, wherein the protected range field is separated into discrete range segments to form the list.

15. One or more non-transitory computer-readable storage media having collectively stored thereon executable instructions that, when executed by one or more processors of a computer system, cause the computer system to perform operations comprising:
selecting a key to associate with a field of a database based at least in part on a request to generate the field, the key inaccessible to a database engine responsible for the database;
preparing underlying fields in the database in place of the field, the underlying fields comprising an encrypted data field and a protected range field, the encrypted data field encrypted based at least in part on the key, and the protected range field comprising a range segment that represents a range of encrypted data values within the encrypted data field; and
maintaining a list to respond to a query for the range of the encrypted data values, the list associating a range of values within the field with the range segment representing the range of encrypted data values within the encrypted data field, the list generated based at least in part on a request for the range of values within the field.

16. The one or more non-transitory computer-readable storage media of claim 15, wherein the list comprises discrete values representing the range of the field.

17. The one or more non-transitory computer-readable storage media of claim 16, wherein the list is updated based at least in part on a threshold of changes that have been made to the field.

18. The one or more non-transitory computer-readable storage media of claim 17, wherein the list is updated by at least recalculating discrete values that represent the range of the field.

* * * * *